United States Patent
Overend et al.

(10) Patent No.: US 11,078,341 B2
(45) Date of Patent: Aug. 3, 2021

(54) THERMOPLASTIC POLYMERS

(71) Applicant: Colorant Chromatics AG, Cham (CH)

(72) Inventors: Andrew Overend, Westhoughton (GB); Steven John Moloney, St. Helens (GB); Bjorn Klaas, Knowsley (GB); Bo Sjoblom, Mariehamn (FI)

(73) Assignee: COLORMATRIX EUROPE LIMITED, Knowsley (GB)

( * ) Notice: Subject to any disclaimer, the term of this patent is extended or adjusted under 35 U.S.C. 154(b) by 80 days.

(21) Appl. No.: 16/596,544

(22) Filed: Oct. 8, 2019

(65) Prior Publication Data

US 2020/0040154 A1 Feb. 6, 2020

Related U.S. Application Data

(62) Division of application No. 14/891,056, filed as application No. PCT/GB2014/051462 on May 13, 2014, now abandoned.

(30) Foreign Application Priority Data

May 13, 2013 (GB) .................................... 1308559

(51) Int. Cl.
| | | |
|---|---|---|
| *C08J 3/22* | (2006.01) | |
| *C08J 9/08* | (2006.01) | |
| *C08J 9/16* | (2006.01) | |
| *C08J 9/18* | (2006.01) | |
| *C08K 3/38* | (2006.01) | |
| *C08K 5/098* | (2006.01) | |
| *C08L 101/00* | (2006.01) | |
| *H01B 3/44* | (2006.01) | |
| *B29C 44/34* | (2006.01) | |
| *B29K 67/00* | (2006.01) | |
| *B29K 77/00* | (2006.01) | |

(52) U.S. Cl.
CPC ............. *C08J 9/08* (2013.01); *B29C 44/3415* (2013.01); *C08J 9/18* (2013.01); *C08K 5/098* (2013.01); *H01B 3/445* (2013.01); *B29K 2067/003* (2013.01); *B29K 2077/00* (2013.01); *B29K 2995/0077* (2013.01); *B29K 2995/0082* (2013.01); *C08J 9/16* (2013.01); *C08J 2201/024* (2013.01); *C08J 2201/03* (2013.01); *C08J 2203/02* (2013.01); *C08J 2207/06* (2013.01); *C08J 2300/22* (2013.01); *C08J 2327/18* (2013.01); *C08J 2327/20* (2013.01)

(58) Field of Classification Search
CPC .................................................. C08J 2201/024
See application file for complete search history.

(56) References Cited

U.S. PATENT DOCUMENTS

| | | | |
|---|---|---|---|
| 2,085,047 A | 6/1937 | Schneider et al. | |
| 4,330,635 A | 5/1982 | Tokas | |
| 4,596,832 A | 6/1986 | Ariga et al. | |
| 4,877,815 A * | 10/1989 | Buckmaster | ........... C08J 9/0033 521/85 |
| 6,013,686 A | 1/2000 | Hamilton et al. | |
| 8,889,046 B2 * | 11/2014 | Kuczynski | .............. B29C 48/92 264/40.1 |
| 2009/0018225 A1* | 1/2009 | Gemmel | .................... C08J 9/08 521/81 |
| 2009/0048359 A1* | 2/2009 | Glew | ..................... C08J 9/0066 521/79 |
| 2010/0256247 A1* | 10/2010 | Brix | ...................... B29C 48/022 521/85 |
| 2017/0105800 A1* | 4/2017 | Prakash | ............. A61B 18/1815 |
| 2020/0385553 A1* | 12/2020 | Galasso | ............. B29C 48/0012 |

FOREIGN PATENT DOCUMENTS

| | | |
|---|---|---|
| EP | 0158266 A2 | 10/1985 |
| EP | 2065155 A2 | 6/2009 |
| GB | 1 320 163 A | 6/1973 |
| JP | S-61171743 A * | 2/1986 |
| WO | 2009019209 A1 | 2/2009 |

OTHER PUBLICATIONS

"Safety Data Sheet" for sodium oxalate, Dec. 28, 15, MP Biomedicals, pp. 1-7.*
English langauge abstract for JPS-61171743-(A) (Feb. 1986) obtained from the European Patent Office.*
Machine translation of the specification of JPS-61171743-(A) (Feb. 1986) obtained from the European Patent Office.*
"Manganese Prices and Manganese Price Charts", accessed May 2017, InfoMine Inc., pp. 1-2.*
Kezhi Wang, "Development and Application of Plastic Additives—Foaming Agents", Shanxi Inst. of Chemical Industry 030021, 5 pages.

* cited by examiner

*Primary Examiner* — Melissa A Rioja
(74) *Attorney, Agent, or Firm* — Fay Sharpe LLP

(57) ABSTRACT

Thermoplastic polymers, for example fluoropolymers, are foamed by use of a solid formulation comprising thermoplastic polymer and manganese oxalate.

10 Claims, No Drawings

THERMOPLASTIC POLYMERS

This invention relates to thermoplastic polymers and particularly, although not exclusively, relates to the foaming of high temperature thermoplastic polymers. Preferred embodiments relate to high resistivity thermoplastic polymers which may be used in electrically insulated products, such as cable insulation, cross-webs and tubing. In other preferred embodiments, high temperature thermoplastic polymers described may be used for tubing or stock profiles such as bar and rod.

Foaming of polymers is a known technique in the polymer industry for the light-weighting of polymer components, improvement of electrical and thermal insulation properties, lower smoke generation, improved flammability behaviour and improved strength to weight ratio. In addition there are clear benefits in terms of reduced material usage and therefore lower cost for like parts when produced in foamed material compared to non-foamed components.

In general terms, there are two techniques used for the manufacture of polymer foams—physical and chemical foaming processes. Physical foaming of polymers is a process by which gas is injected directly into a polymer melt under high pressure during a processing operation. The extent of foaming is controlled by a number of factors including the solubility of the gas in the polymer, the use (or not) of nucleating agents, the quantity of gas injected into the melt and the pressure under which it is applied. The use of this type of foaming process requires the use of specialised equipment. In contrast, chemical foaming agents can be used, the action of which is reliant on the thermal degradation and breakdown of the foaming agent to produce a gas that foams the polymer.

Chemical foaming agents have already been used for a wide variety of polymer systems with considerable success but, thus far, efficient, thermally stable foaming agents for use with the highest processing temperature polymers have remained elusive. Polymers that thus far remain difficult to foam using conventional foaming agents include fluoropolymers, for example fluorinated ethylene propylene copolymer (FEP), include perfluoroalkoxy (PFA), perfluoroalkoxy (methyl vinyl ether) (MFA) and ethylene tetrafluoroethylene (ETFE). Thus far chemical foaming agents based on ammonium polyphosphonate (EP 2065155) and mixed metal carbonates/talc (US2009/0048359) have appeared in the literature for use in high temperature fluoropolymer applications. In the former case the system based on ammonium polyphosphonate has seen little commercial use due to safety concerns associated with the use of ammonia as the foaming gas while in the latter case little market knowledge is available.

In general terms, it is an object of the present invention to address problems associated with foaming of high performance thermoplastics.

According to a first aspect of the invention, there is provided a method of preparing a foamed thermoplastic polymer which comprises subjecting a mixture comprising an oxalate compound and a thermoplastic polymer to a temperature of greater than 300° C.

Said oxalate compound preferably includes at least one metal moiety. Preferably, it includes at least one transition metal moiety. Preferably, it includes a metal moiety with an atomic number of less than 42 or less than 37. The atomic number is suitably greater than 10 or 18. Preferably, said oxalate compound includes a metal moiety selected from period IV of the Periodic Table. Said oxalate compound preferably includes a manganese moiety.

Preferably, the ratio of the weight of said at least one metal moiety divided by the total weight of metal moieties in said oxalate compound is at least 0.4, preferably at least 0.6, more preferably at least 0.8, especially at least 0.95. Preferably, substantially the only metal moiety in said oxalate compound is said one metal moiety. Thus, although oxalate compounds are known which are mixed metal compounds, said oxalate compound preferably includes a single metal, which is preferably manganese.

Preferably, the oxalate compound does not include any cationic or electropositive moiety which is not a metal.

Said oxalate compound is preferably arranged to release a gas when subjected to said temperature in the method. It is preferably arranged to release a carbon-containing gas, for example carbon monoxide and/or carbon dioxide. Said oxalate compound preferably does not release a nitrogen-containing gas (e.g. ammonia) on heating.

Said oxalate compound may be hydrated. Suitably, however, it includes less than 40 wt %, preferably less than 30 wt % water. It preferably includes less than 10 wt %, less than 5 wt %, less than 2 wt %, less than 1 wt % or less than 0.1 wt % water. The oxalate compound may include 1 ppm water. Inclusion of too large an amount of water in the oxalate compound could interfere with the foaming of the thermoplastic polymer, since the water would be gaseous at a temperature far less than 330° C. When a selected oxalate initially includes too large an amount of water, it may be treated to reduce the level of water prior to being subjected to said temperature of greater than 300° C. in the method.

Suitably, the ratio of the weight of said oxalate compound divided by the total weight of all oxalate compounds in the mixture is at least 0.6, preferably at least 0.8, more preferably at least 0.9. The ratio is preferably 1. Thus, preferably only one type of oxalate compound is included in the mixture with said thermoplastic polymer.

Said oxalate compound may include 50 to 70 wt % of moiety $C_2O_4$, preferably 56 to 66 wt % of said moiety and especially 60 to 63 wt % of said moiety.

Said oxalate compound may include 30 to 50 wt % of metal moieties, preferably 34 to 44 wt %, more preferably 37 to 40 wt %. Said metal moieties are preferably selected from transition metals.

Said oxalate compound may include 25 to 40 wt %, preferably 30 to 40 wt %, especially 36 to 41 wt % of manganese moieties.

Said oxalate compound preferably comprises manganese oxalate which suitably includes less than 20 wt %, less than 10 wt %, or less than 5 wt % water. Said oxalate compound preferably comprises 2 wt % or less or 1 wt % or less of water.

Said oxalate compound preferably includes 36 to 41 wt % of manganese moieties, 60 to 63 wt % of moiety $C_2O_4$ and 0 to 5 wt % of water, preferably 0 to 2 wt % of water. More preferably, said oxalate compound subjected to said temperature of greater than 300° C. includes less than 1 wt % water.

Said oxalate compound is preferably particulate. Suitably, 100% of the particles of said oxalate compound would pass through a sieve of mesh size 500 μm, preferably of mesh size 200 μm, more preferably of mesh size 100 μm, especially of mesh size 50 μm.

Said thermoplastic polymer is preferably a high performance thermoplastic polymer.

Unless otherwise stated, melting point of a polymer described herein may be measured by DSC and the value at the top of the endothermic peak reported.

When said thermoplastic polymer is crystalline, it may have a melting point of at least 250° C. It preferably has a melting point in the range 250° C. to 320° C., for example 250° C. to 310° C.

Said thermoplastic polymer may have a continuous use temperature of at least 160° C., preferably at least 190° C. Continuous use temperature may be determined in accordance with Underwriters' Laboratories Inc (UL), Standard for Polymeric Materials Long Term Property Evaluators, UL746B. The continuous use temperature may be less than 300° C. or less than 265° C.

Said thermoplastic polymer may have a melt flow rate (MFR at 372° C./5.0 kg) assessed using ISO12086 in the range 1.2 to 36 g/10 min, preferably in the range 4 to 27 g/10 min, more preferably in the range 4-10 g/10 min Said thermoplastic polymer may have a tensile strength, measured in accordance with ASTM D638 of at least 1500 psi, or preferably at least 2000 psi. The tensile strength may be less than 8000 psi.

Said thermoplastic polymer may have a flexural modulus, in accordance with ASTM D790 at +23° C. of at least 70,000 psi. The flexural modulus may be less than 700,000 psi.

Said thermoplastic polymer may have a tensile modulus, in accordance with ASTM D638, of at least 30,000, preferably at least 40,000. The tensile modulus may be less than 600,000.

Said thermoplastic polymer may have a Tg of at least 125° C. or at least 135° C.

Said thermoplastic polymer may have a heat distortion temperature, measured in accordance with D648, of at least 150° C., preferably at least 170° C.

Said thermoplastic polymer suitably has a melt processing temperature of at least 250° C. or at least 300° C.

Said thermoplastic polymer may be selected from fluoropolymers, high-performance polyamides (HPPAs), liquid crystal polymers, polyamideimides (PAIs), polybenzimidazoles (PBIs), polybutylene terephthalates (PBTs), polyetherimides (PEIs), polyimides (PIs), polyketones (PAEKs), polyphenylene sulfides (PPS), polysulfone derivatives, polycyclohexane dimethyl-terephthalates (PCTs) and syndiotactic polystyrene.

Preferred fluoropolymers include FEP, PFA, MFA and ETFE. Preferred sulphones include PES, PPSE and PSMU. Preferred polyketones are polyaryletherkeytones with polyetheretherkeytones (PEEK) being especially preferred.

In one embodiment, said thermoplastic polymer may be selected from PET and polycarbonate.

Said thermoplastic polymer is preferably a fluoropolymer and FEP is especially preferred.

The ratio of the total weight of thermoplastic polymers divided by the total weight of oxalate compounds in said mixture may be less than 1000, suitably less than 700, preferably less than 500. Said ratio may be at least 10, at least 50, or at least 90. The total amount of oxalate compounds in said mixture may be in the range 0.1 to 2 wt % (e.g. 0.2 to 1 wt %) and the total amount of thermoplastic polymers in said mixture may be in the range 98 to 99.9 wt % (e.g. 99 to 99.8 wt %).

The ratio of the weight of said thermoplastic polymer divided by the weight of said oxalate compound in said mixture may be less than 1000, suitably less than 700, preferably less than 500. Said ratio may be at least 10, at least 50 or at least 90. Said mixture may include 0.1 to 2 wt % (e.g. 0.2 to 1 wt %) of said oxalate and 98 to 99.9 wt % (e.g. 99 to 99.8 wt %) of said thermoplastic polymer.

The ratio of the wt % of said oxalate (preferably manganese oxalate) divided by the sum of the wt % of all blowing agents included in the mixture (i.e. all blowing agents arranged to decompose to produce a gas which can foam the thermoplastic polymer) is suitably at least 0.8, preferably at least 0.9, more preferably at least 0.98, especially 1.

Said mixture preferably does not contain any protic acid. Said mixture preferably does not include any phosphorous-containing blowing agent.

Said mixture preferably includes a single type of blowing agent, which is suitably arranged to decompose to produce a gas which can foam the thermoplastic polymer. Said single type of blowing agent is preferably arranged to release carbon monoxide and/or carbon dioxide and no other gas.

Said mixture may include a nucleator to facilitate formation of a foam. The nucleator is suitably not arranged to produce a gas during preparation of the foamed thermoplastic polymer. Said nucleator suitably comprises (preferably consists of) inorganic particles. It may comprise talc or a zeolite. A preferred nucleator is boron nitride.

In said mixture, the ratio of the total weight of oxalate compounds divided by the total weight of nucleators is suitably at least 0.5, preferably at least 0.9, more preferably at least 1. Said ratio may be less than 10, 8 or 5.

In said mixture, the ratio of the weight of said oxalate compound divided by the weight of nucleators is suitably at least 0.5, preferably at least 0.9, more preferably at least 1. Said ratio may be less than 10.8 to 5.

In said mixture, the ratio of the total weight of thermoplastic polymers divided by the total weight of nucleators is suitably less than 1000, preferably less than 500. The ratio may be at least 20.

In said mixture, the ratio of the weight of said thermoplastic polymer divided by the weight of nucleators is suitably less than 1000, preferably less than 500. The ratio may be at least 20.

A reference herein to "pbw" means "parts by weight".

Preferably, said mixture includes said thermoplastic polymer, said oxalate compound and said nucleator. Said mixture may include 0.1 to 2 pbw (e.g. 0.20 to 1 pbw) total oxalate compounds, 0.1 to 2 pbw (e.g. 0.15 to 0.8 pbw) total nucleators and 100 pbw in total of thermoplastic polymers. Said mixture may include 0.1 to 2 pbw (e.g. 0.20 to 1 pbw) of said oxalate compound, 0.1 to 2 pbw (e.g. 0.15 to 0.8 pbw) of said nucleator and 100 pbw of said thermoplastic polymer. Said mixture may include 0.20 to 0.80 pbw of said oxalate compound, 0.20 to 0.80 pbw of said nucleator and 100 pbw of said thermoplastic polymer.

The sum of the pbw of all blowing agents in the mixture (i.e. all blowing agents arranged to produce a gas which can foam the thermoplastic polymer) is preferably 2 pbw or less, especially 1 pbw or less. The ratio of the pbw of said oxalate (preferably manganese oxalate) divided by the sum of the pbw of all blowing agents in the mixture is suitably at least 0.8, preferably at least 0.9, more preferably at least 0.98, especially 1.

Preferably, said mixture includes 0.1 to 2 wt % (e.g. 0.2 to 1 wt %) of said oxalate compound, 0.1 to 2 wt % (e.g. 0.15 to 0.8 wt %) of said nucleator, and 96 to 99.8 wt % (e.g. 98.2 to 99.65 wt %) of said thermoplastic polymer.

In the mixture, the sum of the wt % of manganese oxalate and thermoplastic polymer is preferably at least 98 wt %, more preferably at least 99 wt %.

In the mixture, the sum of the wt % of manganese oxalate, thermoplastic polymer and nucleators (especially boron nitride) is preferably at least 98 wt %, more preferably at least 99 wt %.

Said method is preferably undertaken in an apparatus (e.g. a melt processing apparatus such as an extruder) operating at a maximum temperature of less than 450° C. or less than 410° C.

In the method, said mixture may be subjected to a temperature of greater than 330° C., suitably greater than 340° C., preferably greater than 350° C., more preferably greater than 360° C. It may be subjected to a maximum temperature of less than 390° C.

In the method, said mixture is suitably subjected to a temperature at which the oxalate compound breaks down to produce one or more gases, for example carbon dioxide and/or carbon monoxide. The gas(es) produced suitably cause(s) the polymer to foam.

The method is suitably carried out in a melt-processing apparatus, for example an extruder or moulding apparatus such as an injection or rotational moulding apparatus. Preferably, the method is carried out in an extruder, for example a single or twin screw extruder.

In a first embodiment, said mixture comprising said oxalate compound and said thermoplastic polymer may be preformed. The method may include a step, prior to subjecting the mixture to a temperature of greater than 300° C., of selecting a preformed mixture comprising said oxalate compound and thermoplastic polymer, wherein said preformed mixture is in a solid state. For example, it may comprise pellets or granules of said oxalate compound and thermoplastic polymer, said pellets or granules being solid at Standard Ambient Temperature and Pressure (SATP) (i.e. 25° C., 100 kPa). Said preformed mixture suitably includes oxalate compound(s) and thermoplastic polymer(s) at the concentrations and/or ratios described above. Thus, suitably in the method, the preformed mixture is selected and subsequently introduced into a melt processing apparatus, wherein it is subjected to a temperature (e.g. of 300° C. or higher) as described above. The preformed mixture may optionally include a nucleator, for example boron nitride, at the concentrations and/or ratios described above. Thus, in the method using the preformed mixture, no additional oxalate compound or thermoplastic polymer needs to be introduced into the melt processing apparatus prior to the mixture being subjected to said temperature of greater than 300° C. in the preparation of said foamed thermoplastic polymer.

In a second embodiment, the method may comprise selecting a thermoplastic polymer to be foamed in the method and contacting the thermoplastic polymer with a composition comprising said oxalate compound. Initial contact may be prior to introduction of thermoplastic polymer and oxalate compound into a melt processing apparatus or initial contact may take place within a melt processing apparatus, for example an extruder.

In an example of the second embodiment, said composition may comprise a masterbatch comprising said oxalate, which is suitably selected and contacted with said thermoplastic polymer, suitably in a melt processing apparatus. Said masterbatch suitably comprises a thermoplastic polymer and said oxalate compound. The thermoplastic polymer in said masterbatch may be the same type and/or have the same identity and/or be substantially identical to the thermoplastic polymer to be foamed in the method. Said masterbatch may include at least 5 wt %, preferably at least 9 wt % of said oxalate compound. The total amount of oxalate compounds in said masterbatch is preferably at least 5 wt % or at least 9 wt %. Optionally, said masterbatch includes a nucleator; it may include 0 to 10 wt % of a nucleator of the type described above. Preferably, said masterbatch includes 2 to 10 wt % of nucleator. A preferred masterbatch includes 70 to 95 wt % of said thermoplastic polymer, 5 to 30 wt % of said oxalate compound, (especially manganese oxalate), 0 to 10 wt % of said nucleator (preferably boron nitride) and 0 to 20 wt % other materials. Other materials may be selected from colours, anti-oxidants and/or other additives to improve ageing properties of the foamed thermoplastic polymer such as zinc oxide. Said masterbatch preferably include 80 to 95 wt % of said thermoplastic polymer, 5 to 20 wt % of manganese oxalate and 0 to 10 wt % of said nucleator which is preferably boron nitride.

In the method, said masterbatch may be contacted with said thermoplastic polymer to be foamed at a let down ratio in the range 5:1 to 30:1. Suitably, 1 to 36 wt % of said masterbatch is contacted with 64 to 99 wt % of said thermoplastic polymer to be foamed in the method, contact suitably taking place in a melt processing apparatus, preferably an extruder. For example, pellets of the masterbatch and pellets of the thermoplastic polymer may be introduced into an extruder via its feedthroat and the two components melt processed together to form a mixture which foams in the method. Suitably 3 to 30 wt %, preferably 5 to 15 wt % of said masterbatch is contacted with 70 to 97 wt %, preferably 85 to 95 wt % of said thermoplastic polymer to be foamed in the method.

Said mixture preferably includes less than 2 wt %, less than 1 wt % or less than 0.5 wt % water immediately prior to being subjected to said temperature greater than 300° C.

Pellets of the masterbatch of the second embodiment suitably include less than 1 wt %, preferably less than 0.5 wt %, especially less than 0.1 wt % water immediately prior to contact with said thermoplastic polymer.

In the method, the foamed thermoplastic polymer suitably has a void content (measured as described herein) of at least 25%, preferably at least 35%, more preferably at least 45%. The void content may be less than 70% or less than 60%. The foamed thermoplastic polymer may have a density in the range 0.6 to 1.7 g/cm$^3$.

In the method, said foamed thermoplastic polymer may define a product which is suitably formed by extrusion. Said product may include an opening surrounded by said foamed thermoplastic polymer. Said product may be elongate (suitably having a length of at least 1 m or at least 10 m). Such a product may have a cross-section, taken transverse to the axis of elongation, comprising an opening defined by said foamed thermoplastic polymer. Said product may comprise cable insulation, cross-webs or tubing. It may comprise a stock shape, such as bar or rod. Said product may be associated with an electrical conductor; and suitably the foamed thermoplastic polymer defines an insulation material for the electrical conductor. Thus, the method suitably comprises associating an electrical conductor (which is suitably arranged to convey current between two locations) with said foamed thermoplastic polymer.

The foamed thermoplastic polymer may be used in products having improved flame or smoke properties or reduced weight. The foamed thermoplastic polymer may have an improved strength to weight ratio compared to non-foamed thermoplastic polymer.

According to a second aspect of the invention, there is provided a formulation for use in preparing a foamed thermoplastic polymer, for example in the method of the first aspect, said formulation comprising a thermoplastic polymer and an oxalate compound as described according to said first aspect.

Said oxalate compound and thermoplastic polymer may be as described according to the first aspect.

Said formulation preferably includes less than 2 wt %, less than 1 wt %, less than 0.5 wt % or less than 0.1 wt % of water. The formulation may include at least 1 ppm water.

Said formulation preferably comprises a 0.2 to 30 pbw of said oxalate compound and 70 to 99.8 pbw of said thermoplastic polymer. In a first embodiment, wherein said formulation need not be let down in a melt-processing apparatus for use in preparing a foamed thermoplastic polymer, said formulation may comprise 0.2 to 1 pbw (preferably 0.2 to 0.5 pbw) of said oxalate and 99.0 to 99.8 pbw (preferably 99.5 to 99.8 pbw) of said thermoplastic polymer. In a second embodiment, said formulation may comprise a solid masterbatch which may be let down in the method. In this case, the masterbatch may include 1 pbw to 30 pbw (suitably 3 to 15 pbw, preferably 5 to 15 pbw) of said oxalate compound and 70 to 99 pbw (suitably 85 to 97 pbw, preferably 85 to 95 pbw) of said thermoplastic polymer.

Said formulation preferably comprises 0.2 to 30 wt % of said oxalate compound and 70 to 99.8 wt % of said thermoplastic polymer. In said first embodiment, said formulation comprises 0.2 to 1 wt % (preferably 0.2 to 0.5 wt %) of said oxalate compound and 99.0 to 99.8 wt % (preferably 99.5 to 99.8 wt % of said thermoplastic polymer. In said second embodiment, said formulation may comprise 1 to 30 wt % (preferably 5 to 15 wt %) of said oxalate compound and 70 to 99 wt % (preferably 85 to 95 wt %) of said thermoplastic polymer.

Said formulation is preferably a solid having a melting point of at least 250° C. Said formulation may include a nucleator.

When said formulation includes a nucleator, it may include 0.2 to 30 pbw, for example 3 to 15 pbw, of said nucleator, for example boron nitride.

Said formulation may be in the form of pellets. Preferably, said pellets are homogenous. Said pellets may have a volume in the range 2 to 50 mm$^3$, suitably 4 to 30 mm$^3$. They suitably include said thermoplastic polymer, said oxalate compound and said nucleator. Said pellets may include 1 to 11 pbw (e.g. 2 to 8 pbw) total oxalate compounds, 0 to 11 pbw (e.g. 1 to 10 pbw) total nucleators and 100 pbw in total of thermoplastic polymers. Said pellets may include 1 to 11 pbw (e.g. 2 to 8 pbw) of said oxalate compound (e.g. manganese oxide), 0 to 11 pbw (e.g. 1 to 11 pbw) of said nucleator and 100 pbw of said thermoplastic polymer.

The sum of the pbw of all blowing agents in the pellets (i.e. all blowing agents arranged to produce a gas which can foam the thermoplastic polymer) is preferably 10 pbw or less, especially 8 pbw or less based on 100 pbw in total of thermoplastic polymers in the pellets. The ratio of the pbw of said oxalate (preferably manganese oxalate) divided by the sum of the pbw of all blowing agents in the pellets is suitably at least 0.8, preferably at least 0.9, more preferably at least 0.98, especially 1.

Preferably, said pellets include 1 to 10 wt % (e.g. 3 to 9 wt %) of said oxalate compound, 0 to 10 wt % (e.g. 2 to 10 wt %) of said nucleator, and 89 to 99 wt % (e.g. 87 to 95 wt %) of said thermoplastic polymer.

In the pellets, the sum of the wt % of manganese oxalate and thermoplastic polymer(s) is preferably at least 98 wt %, more preferably at least 99 wt %.

In the pellets, the sum of the wt % of manganese oxalate, thermoplastic polymer(s) and nucleator(s) (especially boron nitride) is preferably at least 98 wt %, more preferably at least 99 wt %.

Preferred thermoplastic polymers may be selected from fluoropolymers, high-performance polyamides (HPPAs), liquid crystal polymers, polyamideimides (PAIs), polybenzimidazoles (PBIs), polybutylene terephthalates (PBTs), polyetherimides (PEIs), polyimides (Pis), polyketones (PAEKs), polyphenylene sulfides (PPS), polysulfone derivatives, polycyclohexane dimethyl-terephthalates (PCTs) and syndiotactic polystyrene.

The preferred specified groups of polymers have a melting point in the range 250 to 320° C. or in the range 250 to 310° C.

Preferred fluoropolymers include FEP, PFA, MFA and ETFE. Preferred sulphones include PES, PPSE and PSMU. Preferred polyketones are polyaryletherketones with polyetheretherketones (PEEK) being especially preferred.

In one embodiment, said thermoplastic polymer may be selected from PET and polycarbonate.

Said thermoplastic polymer is preferably a fluoropolymer and FEP is especially preferred.

Said oxalate may be as described according to the first aspect. It is preferably manganese oxalate.

Said formulation preferably comprises a thermoplastic polymer which is a fluoropolymer (e.g. FEP) and manganese oxalate. In one preferred embodiment, said formulation comprises 0.2 to 1 wt % of manganese oxalate and 99.0 to 99.8 wt % of fluoropolymer, for example FEP. In another preferred embodiment, said formulation comprises 1 to 30 wt % of manganese oxalate and 70 to 99 wt % of fluoropolymer, for example FEP. According to a third aspect of the invention, there is provided a method of making a formulation according to the second aspect, the method comprising selecting an oxalate compound and selecting a thermoplastic polymer and contacting said oxalate compound with said thermoplastic polymer.

Pellets comprising oxalate compound and thermoplastic polymer may be prepared.

In the method, preferably the temperature of the components (e.g. oxalate and thermoplastic polymer) does not rise above 330° C. and preferably does not rise above 300° C., for example prior to formation of said pellets. The formulation prepared may be in solid form, for example in the form of pellets; it may comprise a solid masterbatch or a solid formulation which is preformed with appropriate levels of oxalate and thermoplastic polymer for foaming in the method of the first aspect, without being let down. In the method of making said formulation, a mixture comprising said oxalate and thermoplastic polymer may be treated in a melt processing apparatus, for example an extruder. The mixture is preferably heated to a temperature of less than 330° C. or more preferably less than 300° C. in the melt processing apparatus. For example, when the melt processing apparatus comprises an extruder, the maximum temperature of zones of the extruder to which the mixture is subjected is suitably less than 330° C. or less than 300° C. Thus, in the method for making said formulation, the oxalate is not subjected to a temperature of greater than 300° C. and, accordingly, it does not significantly decompose to release any carbon-containing gas. However, advantageously, water of hydration (if any) associated with the oxalate compound may be driven off during formation of the solid form. Consequently, when the solid form is used in the method of the first aspect, there is negligible water contained within the oxalate compound which might otherwise interfere with the foaming process.

According to a fourth aspect of the invention, there is provided a foamed thermoplastic polymer comprising the residue of an oxalate compound, for example the residue remaining after the method of the first aspect. The residue may comprise a said metal moiety as described according to the first aspect. The preferred residue comprises an oxide comprising said metal moiety. A preferred residue is manganese oxide. The aforementioned residue may be present at less than 1 wt %, for example at 0.01 to 1 wt % in said foamed plastic polymer.

The foamed thermoplastic polymer may be selected from fluoropolymers, high-performance polyamides (HPPAs), liquid crystal polymers, polyamideimides (PAIs), polybenzimidazoles (PBIs), polybutylene terephthalates (PBTs), polyetherimides (PEIs), polyimides (PIs), polyketones (PAEKs), polyphenylene sulfides (PPS), polysulfone derivatives, polycyclohexane dimethyl-terephthalates (PCTs) and syndiotactic polystyrene.

The preferred specified groups of polymers have a melting point in the range 250 to 320° C. or in the range 250 to 310° C.

Preferred fluoropolymers include FEP, PFA, MFA and ETFE. Preferred sulphones include PES, PPSE and PSMU. Preferred polyketones are polyaryletherketones with polyetheretherketones (PEEK) being especially preferred.

In one embodiment, said thermoplastic polymer may be selected from PET and polycarbonate.

Said thermoplastic polymer is preferably a fluoropolymer and FEP is especially preferred.

Said foamed thermoplastic polymer preferably includes at least 90 wt % of said thermoplastic polymer.

Said foamed thermoplastic polymer with said residue may be in the form of a product as described in the first aspect.

Said foamed thermoplastic polymer may include a nucleator as described above, suitably at a level of 0.01 to 1 wt %.

Any aspect of any invention described herein may be combined with any feature of any other invention or embodiment described herein mutatis mutandis.

Specific embodiments of the invention will now be described, by way of example.

The following materials are referred to hereinafter:

Manganese oxalate refers to manganese (II) oxalate dihydrate obtained from Alfa Aesar GmbH.

DuPont FEP106—refers to fluorinated ethylene propylene copolymers obtained from DuPont.

DuPont FEPCJ99—refers to fluorinated ethylene propylene copolymers obtained from DuPont.

DuPont FEP9494—refers to fluorinated ethylene propylene copolymers obtained from DuPont.

SI64.1 nucleator refers to a masterbatch containing 5 wt % boron nitride (BN) obtained from Colorant Chromatics Group.

EXAMPLE 1—MANUFACTURE OF MANGANESE OXALATE MASTERBATCH CONCENTRATE

Manganese oxalate was pre-blended with DuPont FEP106 pellets by tumble mixing. Tumble blends containing both 5 wt % and 10 wt % manganese oxalate were produced. The pre-blended mixture was then fed by volumetric feeder into a 30 mm diameter twin screw extruder with let-down ratio of 22/1. The extruder temperature settings were 255/255/260/260/265/270/270° C. from the feed throat to the die respectively. The extruder is vented to allow the removal of water of hydration during the masterbatch manufacture process as this has the potential to cause premature foaming in subsequent use of the material if not removed. Improved dispersion of the manganese oxalate was observed after multiple extruder passes. The masterbatch is pelletised at the end of the process.

EXAMPLE 2—MANUFACTURE OF MANGANESE OXALATE MASTERBATCH CONCENTRATE WITH ALTERNATIVE RESIN

Manganese oxalate was pre-blended with DuPont CJ99 pellets by tumble mixing. A tumble blend containing 5% wt manganese oxalate was produced. The pre-blended mixture was then fed by volumetric feeder into a 30 mm diameter twin screw extruder with length/diameter ratio of 22/1. The extruder temperature settings were 276/290/280/280/278/282/285° C. from the feed throat to the die respectively. The extruder is vented to allow the removal of water of hydration during the masterbatch manufacture process as this has the potential to cause premature foaming in subsequent use of the material if not removed. The dispersion of the manganese oxalate was improved after multiple passes through the extruder under these conditions. The masterbatch is pelletised at the end of the process.

EXAMPLE 3—MANUFACTURE OF A COMBINED MANGANESE OXALATE/BORON NITRIDE CONCENTRATE

Manganese oxalate was pre-blended with DuPont CJ99 pellets by tumble mixing. A tumble blend containing 5.5% wt manganese oxalate was produced. The pre-blended mixture was then fed by volumetric feeder into a 30 mm diameter twin screw extruder with length/diameter ratio of 22/1. The extruder temperature settings were 276/290/280/280/278/282/285° C. from the feed throat to the die respectively. The resulting masterbatch was then pre-blended with 5 wt % boron nitride and extruded as a second step using exactly the same processing conditions as the previous step. The resultant formulation therefore contains 5.225% wt manganese oxalate and 5% wt boron nitride. The masterbatch is pelletised at the end of the process.

EXAMPLE 4—MEASUREMENT OF FOAMING

The measurement of the density of the produced foams is carried out using an AG 104 density balance manufactured by Mettler Toledo. The sample is weighed both in air and in water to obtain the density of the material under investigation. The resultant density is used in the calculation of the void content as follows $$\text{Void content} = 100 - ((p1/p2) \ast 100)$$

where p1 and p2 are the densities of the foamed polymer and the unmodified polymer respectively.

EXAMPLE 5—MANUFACTURE OF FOAMED SAMPLES

The manganese oxalate masterbatch was tumble blended with other pellets (e.g. nucleator and/or diluent resin) to be used in the formulations tested. The blend was then added at the feed throat of a single screw extruder with a temperature profile of 280/300/330/380/360/360/340° C. from the feed throat to the die as this is representative of processing conditions used in the manufacture of wire and cable and other FEP products. Different screw speeds were assessed in addition to the effect of the presence of nucleating agent (S164.1) or not. The processing conditions and results are summarised in Table 1. The diluent resin in all cases was DuPont FEP 106.

TABLE 1

| Sample | Loading of foaming masterbatch of Example 1 (wt %) | Loading of nucleator masterbatch (wt %) | Screw rpm | Density (g/cm3) | Void content (%) |
|---|---|---|---|---|---|
| 1 | 5% | 5% | 10 | 1.36 | 37.222 |
| 2a | 10% | — | 18 | 1.06 | 50.972 |
| 3b | 10% | — | 18 | 1.01 | 53.241 |
| 3a | 10% | 5% | 18 | 1.09 | 49.722 |
| 3b | 10% | 5% | 18 | 1.06 | 50.926 |

EXAMPLE 6—MANUFACTURE OF FOAMED SAMPLES USING PELLETS FROM EXAMPLE 2

The manganese oxalate masterbatch was tumble blended with other pellets (e.g. nucleator and/or diluent resin) to be used in the formulations tested. The blend was then added at the feed throat of a single screw extruder with different temperature profiles (T1=280/300/350/400/390/380/380° C.; T2=280/300/350/400/380/370/370 and T3=290/310/360/400/390/380/380° C. from the feed throat to the die) in order to find the optimum processing temperature. Different screw speeds were assessed in addition to the effect of the presence of nucleating agent (S164.1) or not. The processing conditions and results are summarised in Table 2. The diluent resin in all cases was DuPont FEP CJ99.

TABLE 2

| Sample | Loading of foaming masterbatch of Example 2 (wt %) | Loading of nucleator masterbatch (wt %) | Temp profile | Screw rpm | Density (g/cm3) | Void content (%) |
|---|---|---|---|---|---|---|
| 4a | 5% | — | T1 | 10 | 1.91 | 11.136 |
| 4b | 5% | — | T1 | 20 | 1.89 | 12.093 |
| 4c | 5% | — | T1 | 30 | 1.86 | 13.488 |
| 4d | 5% | — | T1 | 40 | 1.84 | 14.419 |
| 4e | 5% | — | T1 | 50 | 1.70 | 20.930 |
| 4f | 5% | — | T3 | 20 | 1.82 | 15.35 |
| 4g | 5% | — | T3 | 40 | 1.84 | 14.42 |
| 4h | 5% | — | T3 | 50 | 1.49 | 30.70 |
| 5a | 10% | — | T3 | 20 | 1.58 | 26.51 |
| 5b | 10% | — | T3 | 40 | 1.35 | 37.21 |
| 6a | 5% | 5% | T3 | 20 | 1.26 | 41.40 |
| 6b | 5% | 5% | T3 | 40 | 1.20 | 44.19 |
| 7a | 10% | 2.5% | T3 | 10 | 1.62 | 24.65 |
| 7b | 10% | 2.5% | T3 | 20 | 1.45 | 32.56 |
| 7c | 10% | 2.5% | T3 | 40 | 0.97 | 54.88 |
| 8a | 10% | 5% | T3 | 13 | 1.21 | 43.72 |
| 8b | 10% | 5% | T3 | 40 | 1.03 | 52.09 |

EXAMPLE 7—MANUFACTURE OF FOAMED SAMPLES USING PELLETS FROM EXAMPLE 3

The combined masterbatch containing both manganese oxalate and boron nitride produced in example 3 was tumble blended with diluent resin pellets to produce the formulations tested. The blend was then added to the feed throat of a single screw extruder using the temperature profile T3 as described in example 6 (i.e. T3=290/310/360/400/390/380/380° C. from the feed throat to the die). Different screw speeds were assessed and the diluent resin in all case was DuPont FEP CJ99. The results are summarised in Table 3.

TABLE 3

| Sample | Loading of foaming masterbatch of Example 3 (wt %) | Screw rpm | Density (g/cm3) | Void content (%) |
|---|---|---|---|---|
| 9a | 5% | 20 | 1.57 | 26.98 |
| 9b | 5% | 40 | 1.25 | 41.86 |
| 9c | 5% | 50 | 1.08 | 49.77 |
| 10a | 10% | 20 | 1.17 | 45.58 |
| 10b | 10% | 40 | 0.89 | 58.60 |
| 10c | 10% | 50 | 0.77 | 64.19 |

From these results the synergistic effect of manufacturing the masterbatch with the incorporation of a single type of masterbatch pellet comprising both manganese oxalate and the boron nitride nucleating agent is evident. For example, in example 6 samples 6a and 6b are analogous to samples 10a and 10b in example 7. In examples 10a and 10b the density is reduced compared to similar samples produced by utilising separate nucleator and foaming agent masterbatches. In addition, sample 9b indicates that using half the active ingredient can result in similar density reductions when a combined masterbatch approach is made.

EXAMPLE 8—MANUFACTURE OF A COMBINED MANGANESE OXALATE/BORON NITRIDE MASTERBATCH BY AN ALTERNATIVE METHOD

Dupont CJ99 resin was tumble blended with manganese oxalate and boron nitride (each at concentrations of 5 wt %). The resultant mixture was then fed by volumetric feeder into a 30 mm diameter twin screw extruder with length/diameter ratio of 22/1. The extruder temperature settings were 276/290/280/280/278/282/285° C. from the feed throat to the die respectively. The extruder is vented to allow the removal of water of hydration during the masterbatch manufacture process as this has the potential to cause premature foaming in subsequent use of the material if not removed. The dispersion of the additives was improved after multiple passes through the extruder under these conditions. The masterbatch is pelletised at the end of the process.

EXAMPLE 9—MANUFACTURE OF FOAMED WIRE FROM PELLETS OF EXAMPLE 8

The combined masterbatch containing both manganese oxalate and boron nitride produced in example 8 was tumble blended with diluent resin pellets (Dupont FEP 9494) at a ratio of 10% wt. the resultant composition was extruded onto 24AWG bare copper using a 38 mm single screw extruder with L/D ratio of 24/1 and a standard FEP screw. The extruder was fitted with a 6.35 mm die with a 1.5 mm tip. A temperature profile of 290/310/370/400/405/405/410/410/425 was used from tip to die with a screw speed of 34 rpm. The resultant insulation had a density of 1.262 g/cm3 and a void content of 41%.

Thus, it is clear from the experiments undertaken that the manganese oxalate masterbatch can advantageously be used to foam the high performance (high melting) thermoplastic. Other high melting thermoplastics may be foamed in a similar manner. i.e. by the manufacture of a masterbatch/compound containing the manganese oxalate foaming agent or a masterbatch/compound containing manganese oxalate foaming agent and boron nitride nucleating agent.

As an alternative to the use of a masterbatch as described, a mixture comprising manganese oxalate (e.g. 0.25-2 wt %) and thermoplastic polymer may be made, in a manner analogous to that described in Example 1, except that the mixture can be used directly in manufacturing a foamed sample without needing to be diluted. Such a mixture could also incorporate nucleator (e.g. boron nitride) at an appropriate concentration (e.g. 0.25 to 2 wt %) so the thermoplastic polymer/manganese oxalate/boron nitride mixture can be used directly to make foamed products.

The invention is not restricted to the details of the foregoing embodiment(s). The invention extends to any novel one, or any novel combination, of the features disclosed in this specification (including any accompanying claims, abstract and drawings), or to any novel one, or any novel combination, of the steps of any method or process so disclosed.

The invention claimed is:

1. A method of preparing a foamed thermoplastic polymer which comprises:
    subjecting a mixture formed by contacting 1 to 36 wt % of a masterbatch with 64 to 99 wt % of a first thermoplastic polymer to be foamed to a temperature of greater than 300° C.,
    wherein the masterbatch is in the form of melt-processed pellets which include 3 to 9 wt % of an oxalate compound, 2 to 10 wt % of a nucleator, and 87 to 95 wt % of a second thermoplastic polymer,
    wherein said second thermoplastic polymer has a melt-processing temperature of at least 250° C. and is a fluoropolymer, and
    wherein said oxalate compound comprises manganese oxalate.

2. The method according to claim 1, wherein said first thermoplastic polymer to be foamed is a fluoropolymer.

3. The method according to claim 2, wherein the first thermoplastic polymer to be foamed is a fluorinate ethylene propylene copolymer (FEP).

4. The method according to claim 1, wherein said mixture is subjected to a temperature of greater than 330° C.; and is subjected to a maximum temperature of less than 390° C.

5. The method according to claim 2, wherein said mixture is subjected to a temperature of greater than 330° C.; and is subjected to a maximum temperature of less than 390° C.

6. The method according to claim 1, wherein said first thermoplastic polymer to be foamed:
    (i) has a melting point of at least 250° C.; and/or
    (ii) has a continuous use temperature of at least 160° C.; and/or
    (iii) has a melt flow rate (MFR) at 372° C. and a 5.0 kg load assessed using ISO12086 in the range 1.2 to 36 g/10 min; and/or
    (iv) has a tensile strength, measured in accordance with ASTM D638, of at least 1500 psi; and/or
    (v) has a flexural modulus, in accordance with ASTM D790 at +23° C., of at least 70,000 psi; and/or
    (vi) has a tensile modulus, in accordance with ASTM D638, of at least 30,000.

7. The method according to claim 4, wherein said first thermoplastic polymer to be foamed is a fluoropolymer.

8. The method according to claim 4, wherein said first thermoplastic polymer to be foamed is a FEP.

9. The method according to claim 1, wherein said nucleator is boron nitride.

10. The method according to claim 1, wherein said first thermoplastic polymer to be foamed is a FEP and said nucleator is boron nitride.

* * * * *